BINARY RADIO RECEIVING SYSTEM

Filed March 12, 1964

INVENTOR.
RICHARD W. CALFEE

BY *Arthur Decker*

ATTORNEY 3,383,600

BINARY RADIO RECEIVING SYSTEM

Richard W. Calfee, San Jose, Calif., assignor to International Business Machines Corporation, New York, N.Y., a corporation of New York Filed Mar. 12, 1964, Ser. No. 351,433
7 Claims. (Cl. 325—320)

ABSTRACT OF THE DISCLOSURE

A binary FSK receiver incorporating a pair of filters, one for each frequency, a first summer to combine the filter outputs into a single waveshape and a leading edge peaker for the waveshape including an amplifier shunted by the serial combination of a delay line and differentiator and a second summer in receipt of the signals from the parallel branches.

This invention relates to binary communications systems of the frequency shift keyed (FSK) type and, more particularly, in such a system, to a receiver capable of coping with problems caused by multipath transmission.

In FSK communications systems, a wave of one frequency is transmitted to represent the "mark" of binary coding while a wave of another frequency is transmitted to represent the "space" of binary coding; one or the other of the frequencies is always transmitted, since one or the other bits of the coding is always present. Such systems are admirably suited for wire or cable and other applications in which mark and space waves are equally attenuated, but utility is severely limited in radio propagation in which selective fading is a problem. This phenomenon comprises interference due to the several transmission paths, which attenuate, by different amounts, signals of different frequencies. Typically, the mark signal may vary in amplitude by 30 db or more, while the space signal, which may differ from the former in frequency by only a few hundred cycles, will undergo amplitude variations of 30 db or more which are uncorrelated in time with those of the mark signal. Severe distortion of the received data signal results and transmission thus becomes marginal and unreliable.

Conventional communications systems depend upon there being present at all times a signal at the receiver to operate its a.g.c. circuits or limiters, which compensate for attenuation variations in the signal caused by the transmission medium. The use of limiters in such conventional systems causes the channel to be highly non-linear, resulting in severe cross modulation between the mark and space signals when multipath spreading is present. The amplitude-limited signal is fed to filter networks or a discriminator to provide an output whose amplitude is dependent on the frequency of the signal. The result, for example, may be an output of +10 volts for the mark frequency, —10 volts for the space frequency and zero volts for noise only. This square-wave signal may then be used to drive, with its leading and trailing edges, a bistable state decision circuit, such as a Schmitt trigger, having triggering threshold levels at a few volts more positive and more negative than zero volts; the state of the trigger thus indicates the transmitted binary coding.

Under conditions of selective fading, however, there will be frequent periods when either the mark or space signal will be considerably attenuated in its propagation through the medium. During these periods, the signal which is not so attenuated will provide an input which can set the trigger to only one of its states, since the signal generated when the critically-attenuated frequency is transmitted will not exceed the trigger threshold; the trigger state will thus not accurately indicate the transmitted binary coding.

A solution to the problem of selective fading in present practice utilizes diversity techniques in which two complete sets of mark and space signals, different in frequency, are generated in accordance with the binary coding. In the receiver, the outputs of both mark and both space channels are combined and then used to drive the trigger. Improvement in reliability is obtained in a diversity system because of the unlikelihood of two different mark frequencies or two different space frequencies simultaneously failing to propagate. It is evident that this system, however, is exceedingly wasteful of radio spectrum space, transmitter power and communications equipment.

It is thus an object of the present invention to provide increased reliability in a binary radio communications system not characterized by the aforementioned disadvantages.

The invention accomplishes this object by adapting, to an FSK receiver-demodulator, a circuit which accentuates, i.e., peaks, the leading and trailing edges of the FSK audio signal; the extent of the peaking is such that, at every transition of the signal, the trigger input is driven beyond its threshold levels. The circuit comprises a paralleled amplifier and differentiator feeding into a summer and is installed, in a typical FSK receiving station, between the low pass filter and trigger input. A delay unit is included in the differentiator branch of the circuit since the FSK audio waveshape is not usually sufficiently sharp.

The foregoing and other objects, features and advantages of the invention will be apparent from the following more particular description of a preferred embodiment of the invention, as illustrated in the accompanying drawings.

Figure 1:
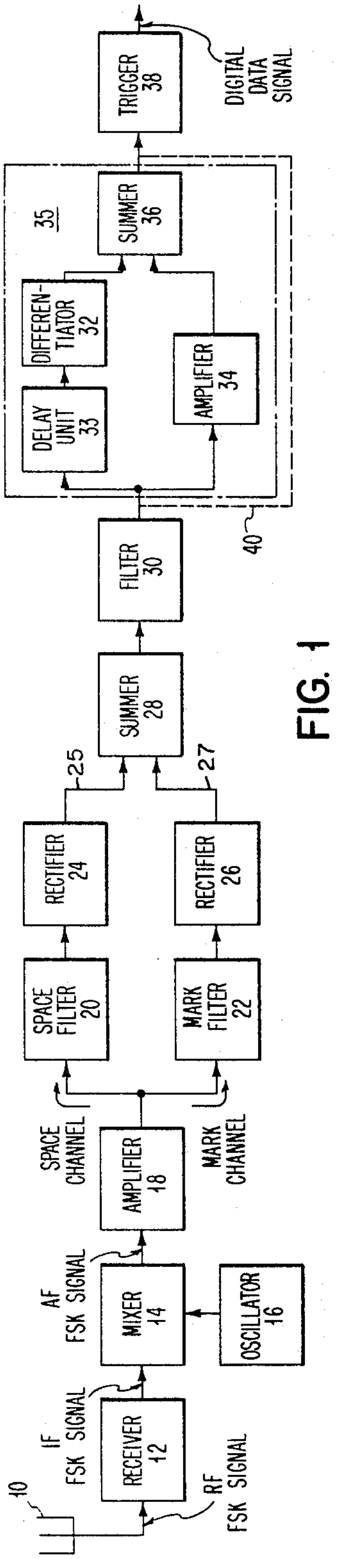
FIGURE 1 is the block diagram of a typical FSK receiving station in which the peaking circuit has been installed.

In FIGURE 1, a block-diagram representation of a receiving station for FSK digital signals much of the circuitry of which is known, antenna 10 presents the two radio-frequency (RF) FSK signals, typically at 11.7073 mc. and 11.7077 mc., to receiver 12 which demodulates to produce corresponding intermediate-frequency (IF) FSK signals, typically at 499.8 kc. and 500.2 kc. These are again demodulated by mixer 14 and oscillator 16 to generator audio-frequency (AF) FSK signals, at, for instance, 1500 c./s. and 1900 c./s., which are amplified by amplifier 18. A pair of filters 20 and 22, located at the output of amplifier 18, separates the AF mark (1500 c./s.) and space (1900 c./s.) signals; the filter 22 energizes full-wave rectifier 26 to emit a positive pulsating D.-C. wave on line 27 only when the mark RF is detected and the filter 20 energizes full-wave rectifier 24 to emit a negative pulsating D.-C. wave on line 25 only when the space RF is detected. Lines 25 and 27 provide input to summer 28, which, in turn, drives low pass filter 30, having a cut-off at about 400 c./s. The output of filter 30 comprises a roughly square waveshape, the crests (positive excursions) of which correspond to the mark signal transmission and the troughs (negative excursions) of which correspond to the space signal transmission; this waveshape is fed via line 40 to the input of trigger 38, the output of which is a replica of the transmittal digital data signal.

The operation of the circuit described above is illustrated in FIGURE 2, in which the solid line waveshape comprising crests 44 and troughs 46, represents the signal on line 40 of FIGURE 1 generated during no-fade transmission. Both mark and space amplitudes are seen to be distant from the set ("1") and reset ("0") triggering levels of trigger 38; as a result, trigger 38 is reliably triggered by the leading and trailing edges of the waveshape and thus its output is a faithful replica of the digital data signal. However, consider the effect of atmospherics which cause a partial or complete fade of, for instance, the space frequency, such that troughs 42 of the waveshape on line 40 are positioned, as shown, at a level for which the trailing edges of the waveshape do not exceed the negative potential required to reset trigger 38. In this case, the prior state (set) of trigger 38 will prevail, indicating a bit "1" in the data, during time intervals when the indication should be of a bit "0".

Referring again to FIGURE 1, line 40 is seen by-passed by peaking circuit 35, which, according to the present invention, will be shown to operate so as to obviate the disadvantage discussed above. The output of filter 30 feeds, in circuit 35, paralleled branches, one including the serial combination of delay unit 33 and differentiator 32, and the other including amplifier 34. Differentiator 32, which may be of the resistor-capacitor type, is constructed with a time constant, effective at the digital data rate established for the communications system, to peak the signal transitions, whereas amplifier 34 provides straight amplification of the filtered waveshape. The peaking by differentiator 32 is made effective by delay unit 33, which may be of the lumped constant delay line type with a delay of about ⅕ of a bit period of the data, at the crest or trough of the waveshape and not at the center of the transitions thereof. The outputs of differentiator 32 and amplifier 34 are combined arithmetically in summer 36, the output of which is fed to the input of trigger 38.

Figure 2:
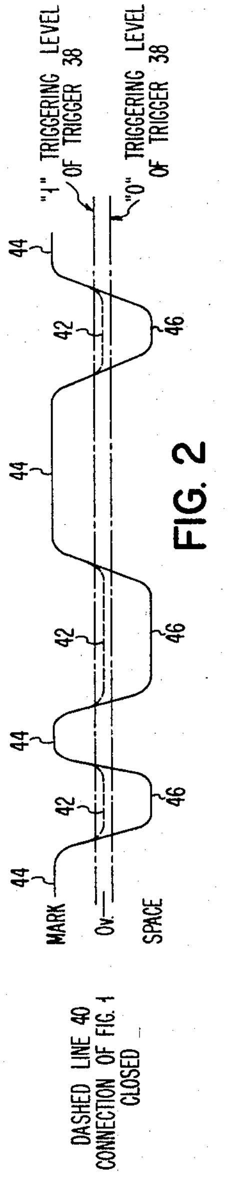
FIGURE 2 is a waveshape diagram of the operation of the receiving station of FIGURE 1 with the peaking circuit by-passed.
Figure 3:
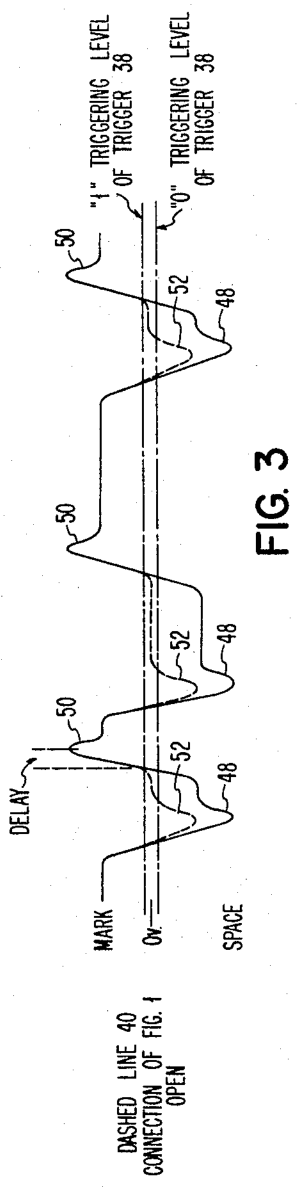
FIGURE 3 is a waveshape diagram of the operation of the receiving station of FIGURE 1 with the peaking circuit effective.

The solid line waveshape in FIGURE 3 illustrates the operation of circuit 35 by corresponding to the solid line waveshape of FIGURE 2. Crest peaks 50 and trough peaks 48 are produced by delay unit 33 and differentiator 32 at the leading and trailing edges, respectively, of the waveshape. In non-fade signal reception, these peaks in no way affect the operation of trigger 38. Fade of the space signal affects the waveshape of FIGURE 3 as shown by the dashed-line troughs carrying peaks 52, which, although the main portion of the trough is within the non-triggering range of trigger 38, extend below the reset level and consequently are effective to establish a bit "0" in trigger 38 as required by the transmitted data. The parameters of circuit 35 and their cooperation is such as to provide an amplitude of peaks 52 which is at least equal to the triggering level or threshold of trigger 38; thus, any initiation of a trailing edge in the waveshape will exceed the reset threshold of trigger 38 and provide the proper bit representation in its output. As should be obvious, the inclusion of delay unit 33 in circuit 35 may be unnecessary where the leading and trailing edges of the waveshape in FIGURE 2 are sufficiently abrupt so that peaking by differentiator 32 at the transition, when summed with the output of amplifier 34, will override the threshold levels of trigger 38.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. In an FSK receiver incorporating a detector of transmitted mark and space frequencies, a separate channel including a filter and rectifier for each frequency, a summer connected to the channels for combining the signals thereof to provide a bi-valued signal, and a bistable state circuit; an input circuit for the bistable state circuit, comprising:

- an amplifier in a first channel coupled to the output circuit of the summer;
- a differentiator in a second channel coupled to the output circuit of the summer, said channels being connected in parallel; and
- a summing circuit responsive to said amplifier and said differentiator and connected to the input circuit of the bistable state circuit.

2. The combination of claim 1 wherein said differentiator generates peaks at the edges of the bi-valued signal.

3. The combination of claim 2 wherein the peaks generated by said differentiator have amplitudes whereby the composite signal input to the bistable state circuit is of sufficient amplitude for triggering such bistable circuit.

4. The combination of claim 3 and

- a delay unit serially connected to said differentiator for providing a delay such that the peaks generated by said differentiator occur at the crests and troughs of the signal from the summer.

5. The combination of claim 4 wherein

- the delay provided by said delay unit is approximately ⅕ of a bit period of the bi-valued signal.

6. In a receiver responsive to a binary-coded FSK signal to generate a corresponding audio signal and having a trigger the output of which represents the binary coding, the combination of:

- means to separate the audio signal into mark and space signals;
- means to combine the mark and space signals to form a square-wave signal;
- means to add pulse peaks at the leading edges of the crests and troughs of the square-wave signal, the peaks having amplitudes exceeding the triggering level of the trigger; and
- means to connect said adding means to the input of the trigger.

7. The combination of claim 6 wherein said adding means comprises:

- a first parallel branch including a serially connected delay unit and a differentiator;
- a second parallel branch including an amplifier;
- a summing circuit responsive to the outputs of said first and second branches.

References Cited

UNITED STATES PATENTS

| | | | |
|---|---|---|---|
| 2,211,750 | 8/1940 | Humby et al. | 178—66 |
| 3,252,098 | 5/1966 | Schlaepfer | 328—58 |
| 2,572,080 | 10/1951 | Wallace | 328—58 |
| 3,189,826 | 6/1965 | Mitchell et al. | 325—320 X |
| 3,252,099 | 5/1966 | Dodd | 328—164 X |

ROBERT L. GRIFFIN, *Primary Examiner.*

JOHN W. CALDWELL, *Examiner.*

W. S. FROMMER, *Assistant Examiner.*